United States Patent
Hwang et al.

(10) Patent No.: US 8,174,606 B2
(45) Date of Patent: May 8, 2012

(54) DIGITAL PHOTOGRAPHING APPARATUS, METHOD OF CONTROLLING THE SAME, AND RECORDING MEDIUM STORING PROGRAM TO EXECUTE THE METHOD TO PROVIDE LIVE VIEW IMAGES IN A PHOTOGRAPHING MODE

(75) Inventors: Chi-hun Hwang, Suwon-si (KR); Myung-gyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 12/491,340

(22) Filed: Jun. 25, 2009

(65) Prior Publication Data

US 2010/0007771 A1    Jan. 14, 2010

(30) Foreign Application Priority Data

Jul. 11, 2008  (KR) .................. 10-2008-0067825

(51) Int. Cl.
*H04N 5/225* (2006.01)
*G02B 13/16* (2006.01)

(52) U.S. Cl. ...................... 348/341; 348/335

(58) Field of Classification Search .............. 348/335, 348/337, 341, 343–344
See application file for complete search history.

(56) References Cited

U.S. PATENT DOCUMENTS

| | | | |
|---|---|---|---|
| 2005/0168622 A1* | 8/2005 | Kawai et al. | 348/360 |
| 2006/0158530 A1* | 7/2006 | Hirai | 348/222.1 |
| 2008/0080739 A1* | 4/2008 | Muramatsu | 382/103 |

* cited by examiner

*Primary Examiner* — Kelly L Jerabek
(74) *Attorney, Agent, or Firm* — Drinker Biddle & Reath LLP

(57) ABSTRACT

A digital photographing apparatus is provided including a lens unit, an imaging device, and a main mirror disposed between the lens unit and the imaging device, wherein the position of the main mirror can be changed so that the main mirror either reflects at least part of light which passed through the lens unit toward a first orientation or the main mirror is not positioned on a path of the light which passed through the lens unit such that the light can be incident to the imaging device. A prism unit, a viewfinder, and an image sensor for live view are also included in the apparatus. A method of controlling the digital photographing apparatus, and a storage medium having recorded thereon a computer program for executing the method are also provided.

13 Claims, 5 Drawing Sheets

DIGITAL PHOTOGRAPHING APPARATUS, METHOD OF CONTROLLING THE SAME, AND RECORDING MEDIUM STORING PROGRAM TO EXECUTE THE METHOD TO PROVIDE LIVE VIEW IMAGES IN A PHOTOGRAPHING MODE

CROSS-REFERENCE TO RELATED PATENT APPLICATION

This application claims the benefit of Korean Patent Application No. 10-2008-0067825, filed on Jul. 11, 2008 in the Korean Intellectual Property Office, the entire contents of which is incorporated herein by reference.

BACKGROUND OF THE INVENTION

1. Field of the Invention

The present invention relates to a digital photographing apparatus, a method of controlling the same, and a recording medium having recorded thereon a computer program to execute the method. More particularly, the present invention relates to a single lens reflex type digital photographing apparatus capable of displaying live view images on a display unit, a method of controlling the same, and a recording medium having recorded thereon a computer program to execute the method.

2. Description of the Related Art

Generally, a digital photographing apparatus acquires still image data from light that is incident onto an imaging device via a lens unit. Such a digital photographing apparatus generally includes a display unit so that obtained still images can be displayed on the display unit. Furthermore, recent compact type digital photographing apparatus arrangements display live view images (preview images), which are motion pictures displayed in real time, for easier angle determination in a photographing mode.

Accordingly, such digital photographing apparatus arrangements obtain still image data and/or live view image data from light that is incident onto imaging devices. Compact type digital photographing apparatus arrangements can display live view images (preview images) on display units because light continuously enters imaging devices. Meanwhile, conventional single lens reflex (SLR) type digital photographing apparatus arrangements cannot display live view images on display units. In other words, in a conventional SLR type digital photographing apparatus, light which passed through a lens unit is reflected by a main mirror and is incident onto eyes of a user, and is not incident onto an imaging device at this time. Light which passed through the lens unit is incident onto the imaging device and still image data is obtained only when the position of the main mirror is changed and an actual photographing operation is performed in response to a signal from the user. Thus, conventional digital photographing apparatus arrangements cannot display live view images (preview images) on display units in a photographing mode.

SUMMARY OF THE INVENTION

The present invention provides a single lens reflex (SLR) type digital photographing apparatus that is capable of displaying live view images on a display unit, a method of controlling the same, and a recording medium having recorded thereon a computer program to execute the method.

According to an embodiment of the present invention, a digital photographing apparatus is provided. The digital photographing apparatus includes: a lens unit through which light bouncing off a subject to be photographed passes; an imaging device generating image data when the light that passed through the lens unit is incident thereon; a main mirror disposed between the lens unit and the imaging device, wherein the position of the main mirror can be changed so that the main mirror either reflects at least part of the light which passed through the lens unit in a first orientation, or the main mirror is not positioned on a path of the light which passed through the lens unit such that the light can be incident onto the imaging device; a prism unit located in the first orientation so that light reflected by the main mirror is incident onto the prism unit and is output in a second orientation when at least part of the light which passed through the lens unit is reflected by the main mirror; a viewfinder located in the second orientation so that at least part of light output from the prism unit passes through the viewfinder; and an image sensor for live view, disposed on one surface of the prism unit.

The prism unit may comprise a pentaprism.

The prism unit may comprise a plurality of prisms.

When a surface onto which light reflected by the main mirror is incident is a first surface, a surface through which light output from the prism unit finally passes is a second surface, and a surface on which the image sensor for live view is disposed is a third surface, the third surface may be one of surfaces of the prism unit excluding the first surface and the second surface.

At least a portion of the third surface may be photo-transmissive so that at least part of light incident onto the prism unit is transmitted through the portion of the third surface and is incident onto the image sensor for live view.

The third surface of the prism unit may be one of surfaces which reflects light incident onto the prism unit via the first surface and incident onto the viewfinder via the second surface, and at least a portion of the third surface may be photo-transmissive.

The third surface of the prism unit may not be one of surfaces which reflects light incident onto the prism unit via the first surface and incident onto the viewfinder via the second surface, and at least a portion of the third surface may be photo-transmissive.

A sub prism may be disposed on the third surface of the prism unit, and light which passed through the third surface may pass through the sub prism and may be incident onto the image sensor for live view.

A sub lens may further be disposed between the sub prism and the image sensor for live view.

According to another embodiment of the present invention, a method of controlling a digital photographing apparatus is provided. The method includes: (a) positioning a main mirror on a path along which light which passed through a lens unit travels so that at least part of the light is reflected in a first orientation; and (b) when light reflected by the main mirror is incident onto a prism unit disposed in the first orientation in (a), at least part of the light travels toward a viewfinder disposed in a second orientation, and remaining part of the light travels toward an image sensor for live view disposed on one of surfaces of the prism unit, so that data is obtained from the light incident onto the image sensor for live view and live view images are displayed on a display unit.

The method may further include (c) changing the position of the main mirror such that the main mirror is not positioned on the path along which light which passed through the lens unit travels so that the light which passed through the lens unit is incident onto an imaging device.

Live view images may not be displayed on the display unit while light which passed through the lens unit is incident onto the imaging device.

According to another embodiment of the present invention, a storage medium having recorded thereon a computer program for executing the method described above is provided.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining preferred embodiments of the invention with reference to the attached drawings.

Figure 1:
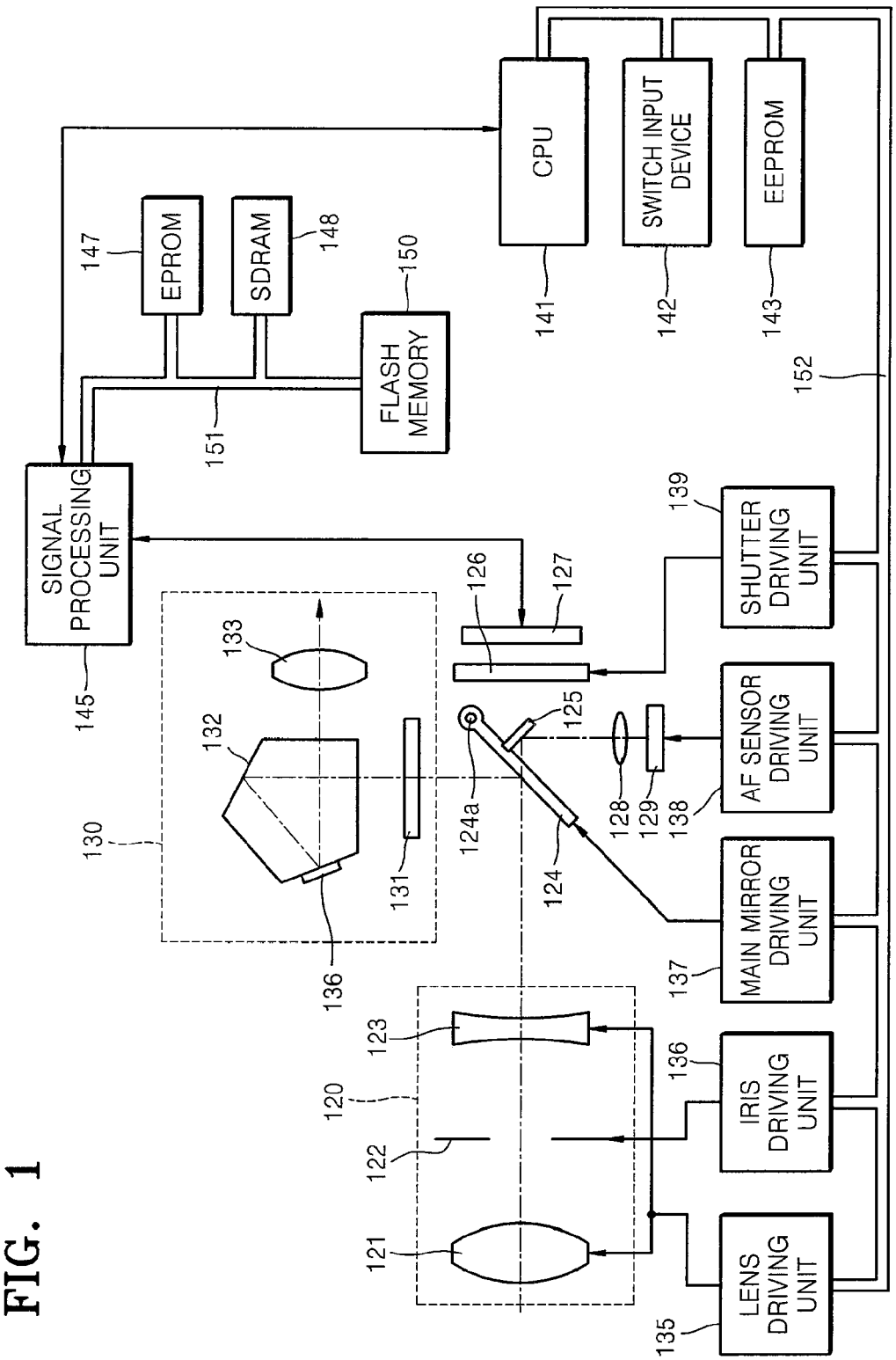
FIG. 1 is a block diagram showing an example of a digital photographing apparatus according to an embodiment of the present invention.
Figure 2:
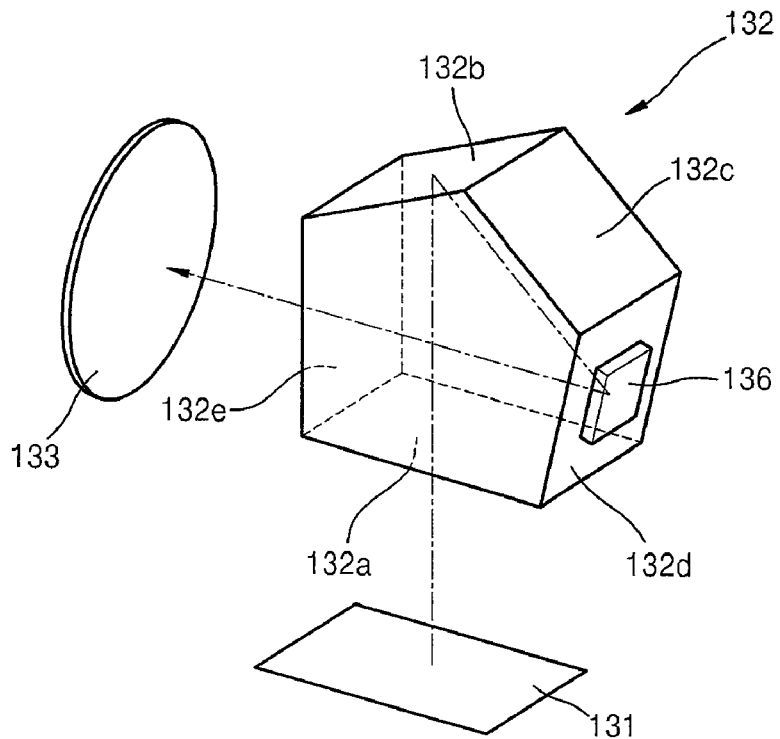
FIG. 2 is an oblique view showing an example of a finder optical system of the digital photographing apparatus of FIG. 1.

FIG. 1 is a block diagram showing an example of a digital photographing apparatus according to an embodiment of the present invention. FIG. 2 is an oblique view showing an example of a finder optical system of the digital photographing apparatus of FIG. 1. Referring to the example of FIG. 1, the digital photographing apparatus includes a lens unit 120, an imaging device 127, a main mirror 124, and a finder optical system 130. The finder optical system 130 includes a prism unit 132 and an image sensor 136 for live view. The digital photographing apparatus may include various other components if required. Hereinafter, the digital photographing apparatus including only the components shown in the examples of FIGS. 1 and 2 will be described for convenience of explanation.

Light bouncing off a subject to be photographed passes through the lens unit 120. As shown in the examples of FIG. 1, the lens unit 120 may include a plurality of lenses such as a first lens 121 and a second lens 123. An iris 122 may be disposed between the lenses or behind the lenses. At least some of lenses in the lens unit 120 are driven and controlled by a lens driving unit 135, and the iris 122 is driven and controlled by an iris driving unit 136.

The main mirror 124 is located behind the lens unit 120 on the optic axis of the lens unit 120. Accordingly, the main mirror 124 is disposed between the lens unit 120 and the imaging device 127. As shown in FIG. 1, the main mirror 124 is located in a path along which light that passed through the lens unit 120 travels and can reflect at least part of the light that passed through the lens unit 120 in a predetermined direction. The location of the main mirror 124 may be changed by rotating it with a predetermined angle around an axis 124a. Thus, light which passed through the lens unit 120 may be directly incident onto the imaging device 127.

The center region of the main mirror 124 may be a half mirror region. With regard to the main mirror 124, a sub mirror 125 is located behind the main mirror 124, and thus part of light incident onto the lens unit 120 passes through the main mirror 124 and is reflected by the sub mirror 125. A separator optical system 128 and/or an auto-focusing (AF) sensor 129 is/are disposed on the axis of light reflected by the sub mirror 125. The AF sensor 129 is connected to an AF sensor driving unit 138. The sub mirror 125, the separator optical system 128, and the AF sensor 129 are units for detecting a focus, so that an auto-focusing operation can be performed via the lens unit 120 under control of a CPU 141.

As described above, the location of the main mirror 124 may be changed by rotating it with a predetermined angle around the axis 124a. Thus, the main mirror 124 is not located in a path along which light that passed through the lens unit 120 travels, so that the light which passed through the lens unit 120 may be directly incident onto the imaging device 127 without being reflected by the main mirror 124. A shutter 126 is disposed between the imaging device 127 and the lens unit 120. Thus, in response to a signal from a user, the shutter 126 is driven and controlled by a shutter driving unit 139 to be kept open for a predetermined time such that light which passed through the lens unit 120 can be incident onto the imaging device 127. The imaging device 127 generates image data from the incident light.

When the main mirror 124 is positioned as shown in FIG. 1, the main mirror 124 reflects at least part of light which passed through the lens unit 120 in a predetermined direction. The remaining part of light which is not reflected by the main mirror 124 passes through the main mirror 124 and is incident onto the sub mirror 125. In this case, the finder optical system 130 including a focusing screen 131, the prism unit 132, a viewfinder 133, and the image sensor 136 for live view is disposed on the path along which light reflected by the main mirror 124 travels. Light bouncing off a subject to be photographed passes the lens unit 120, is reflected by the main mirror 124, and forms an image on the focusing screen 131. A user can confirm the subject's image as formed on the focusing screen 131 via the prism unit 132 and the viewfinder 133. The finder optical system 130 will be described later with reference to the example of FIG. 2.

The lens driving unit 135, the iris driving unit 136, a main mirror driving unit 137, and the shutter driving unit 139 may be connected to the CPU 141 via a data bus 152. Furthermore, a switch input device 142 and an electrically erasable/programmable read only memory (EEPROM) 143, which is a non-volatile memory, may also be connected to the CPU 141 via the data bus 152. The switch input device 142 includes a shutter-release button (not shown) and a power button (not shown), and transmits a signal generated when a user operates one of the buttons to the CPU 141.

The CPU 141 drives and controls the AF sensor driving unit 138 to obtain focusing data, and drives and controls the lens driving unit 135 to perform auto-focusing by controlling at least some of the lenses of the lens unit 120. Furthermore, the CPU 141 drives and controls the main mirror driving unit 137 according to a signal from a user and relocates the main mirror 124 such that light which passed the lens unit 120 is not reflected by the main mirror 124. Furthermore, the CPU 141 calculates appropriate opening area and time of shutter exposure by using information regarding brightness of the subject to be photographed based on output power of the AF sensor 129, drives and controls the iris driving unit 136 to drive the iris 122, and drives and controls the shutter driving unit 139 to drive the shutter 126.

Accordingly, when the imaging device 127 obtains analog data, the analog data is converted to digital data in a signal processing unit 145. Nevertheless, the imaging device 127 can also obtain digital data.

The signal processing unit 145 is connected to an electrically programmable read only memory (EPROM) 147, a synchronous dynamic random access memory (SDRAM) 148, and a flash memory 150 via a data bus 151. The EPROM 147 stores programs executed by a processor of the signal processing unit 145. The SDRAM 148 is a memory for temporarily storing image data before image processes or image data in image processes. The flash memory 150 is a non-volatile memory storing final image data.

Referring to the example of FIG. 2, the finder optical system 130 of the digital photographing apparatus according to the current embodiment will be described below in more detail.

The finder optical system 130 includes the focusing screen 131, the prism unit 132, the viewfinder 133, and the image sensor 136 for live view. An image corresponding to light which passed the lens unit 120 and is reflected by the main mirror 124 is formed on the focusing screen 131. When at least part of light which passed the lens unit 120 is reflected by the main mirror 124, the light reflected by the main mirror 124 is incident onto the prism unit 132 in a predetermined direction and is output from the prism unit 132 in another direction, that is, toward the viewfinder 133. The light from the prism unit 132 reached the eyes of a user via the viewfinder 133. The image sensor 136 for live view is located on one of surfaces of the prism unit 132.

In a conventional single lens reflex (SLR) type digital photographing apparatus, light which passed through a lens unit is not incident onto an imaging device in a photographing mode. The light is reflected by a main mirror, passes through a prism unit, and is incident onto the eyes of a user via a viewfinder. Light which passed through a lens unit can only be incident to an imaging device only when the location of a main mirror is changed for a photographing operation in response to a signal from a user. Accordingly, still image data is obtained. Thus, a conventional SLR type digital photographing apparatus cannot display live view images (preview images) on a display unit in photographing mode.

However, in case of a SLR type digital photographing apparatus according to the current embodiment, even if light which passed through the lens unit 120 is reflected by the main mirror 124, passes through the prism unit 132, and is incident onto the eyes of a user via the viewfinder 133 without being incident onto the imaging device 127, part of light reflected by the main mirror 124 and incident onto the prism unit 132 is incident onto an image sensor 136 for live view, which is disposed on one of surfaces of the prism unit 132. Thus, the image sensor 136 for live view can generate live view image data and display the live view image data on a display unit of the digital photographing apparatus. Accordingly, unlike a conventional SLR type digital photographing apparatus, a SLR type digital photographing apparatus according to the current embodiment can maximize user convenience of operating the digital photographing apparatus by displaying live view images (preview images) on a display unit in a photographing mode.

Meanwhile, as shown in the examples of FIGS. 1 and 2, the prism unit 132 may be a pentaprism. This pentaprism is a prism having five surfaces 132a through 132e when two side surfaces are excluded. However, the present invention is not limited thereto, and the prism unit 132 may have different shapes, such as, for example, a porroprism.

Among the surfaces of the prism unit 132, a surface 132a onto which light reflected by the main mirror 124 is incident will be referred as a first surface, a surface 132e through which light output from the prism unit 132 passes finally will be referred as a second surface, and a surface 132d on which the image sensor 136 for live view is disposed will be referred as a third surface. The third surface may be any one surface of the surfaces of the prism unit 132 except the first surface 132a and the second surface 132e. At this point, at least portion of the third surface (a surface referred to as 132d in the example of FIG. 2) of the prism unit 132 may transmit at least part of light incident thereon such that the transmitted light is incident onto the image sensor 136 for live view.

Meanwhile, as shown in the example of FIG. 2, the third surface (a surface referred to as 132d in the example of FIG. 2) of the prism unit 132 may be one of surfaces 132b and 132d that reflects light incident onto the prism unit 132 via the first surface 132a and also incident onto the viewfinder 133 via the second surface 132e. In this case, at least a portion of the third surface may transmit part of the light. If the portion of the third surface totally transmits the light, a user may experience difficulties for setting an angle of a subject to be photographed when using the viewfinder 133.

Figure 3:
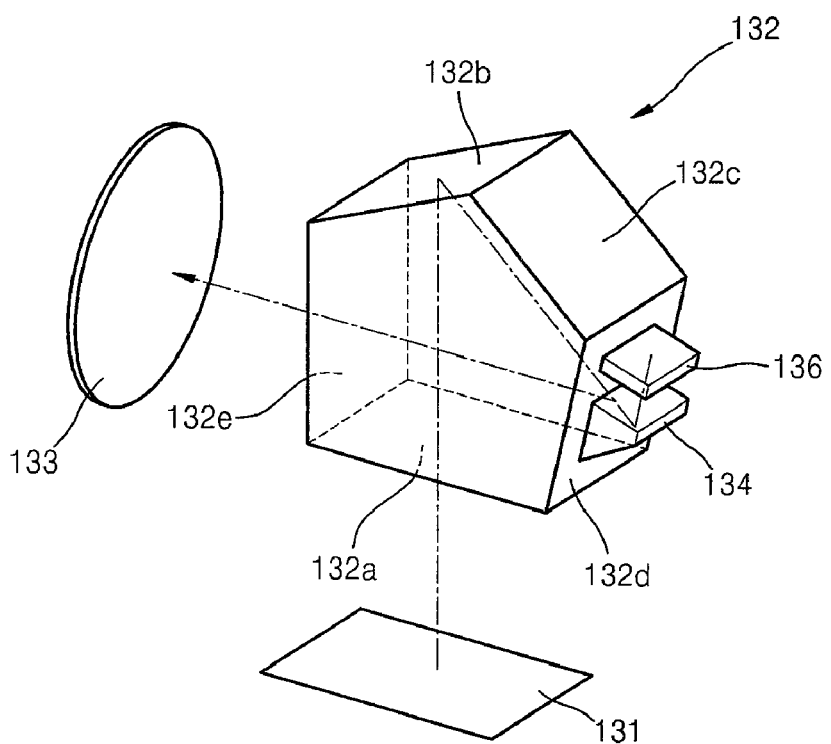
FIG. 3 is an oblique view showing an example of a finder optical system of a digital photographing apparatus, according to another embodiment of the present invention.
Figure 4:
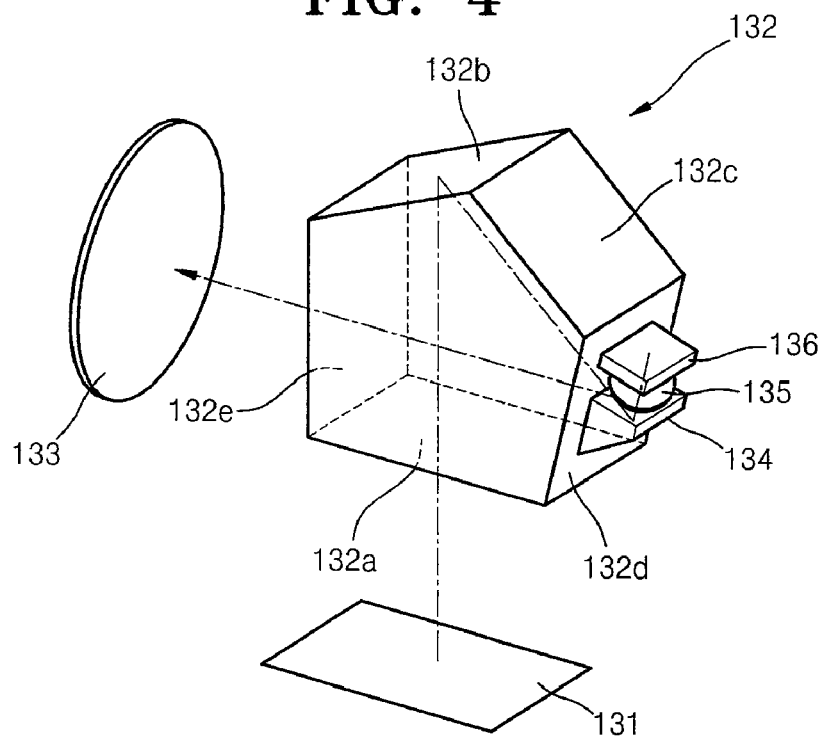
FIG. 4 is an oblique view showing an example of a finder optical system of a digital photographing apparatus, according to another embodiment of the present invention.

FIG. 3 is an oblique view showing an example of a finder optical system of a digital photographing apparatus, according to another embodiment of the present invention. As shown in the example of FIG. 3, the prism unit 132 further includes a sub prism 134 on the third surface (a surface referred to as 132d in the example of FIG. 3) of the prism unit 132, and light which passed through the third surface may be incident onto the image sensor 136 for live view after passing through the sub prism 134. Among surfaces of the sub prism 134, a surface which reflects light incident thereon may be a reflective surface, that is, a surface processed to totally reflect light. As shown in FIG. 4, which is an oblique view showing an example of a finder optical system of a digital photographing apparatus according to another embodiment of the present invention, the finder optical system may further include a sub lens 135 disposed between the sub prism 134 and the image sensor 136 for live view. The sub lens 135 may be disposed on a path of light incident onto the image sensor 136 for live view to prevent distortion of images.

Meanwhile, although the prism unit 132 is shown as a pentaprism in the examples of FIGS. 2 through 4, the present invention is not limited thereto, and the shape of the prism unit 132 may vary. For example, the prism unit 132 may be a loop pentaprism in which a surface 132b among surfaces which reflect light includes two surfaces perpendicular to each other or a porroprism including a plurality of prisms.

Meanwhile, if the prism unit 132 is a pentaprism, a plurality of surfaces reflect light incident thereon, as shown in the example of FIG. 2. Therefore, various changes can be made to the prism units. For example, as shown in FIG. 2, the surface 132d may be the third surface and the image sensor 136 for live view may be disposed on the surface 132d.

Figure 5:
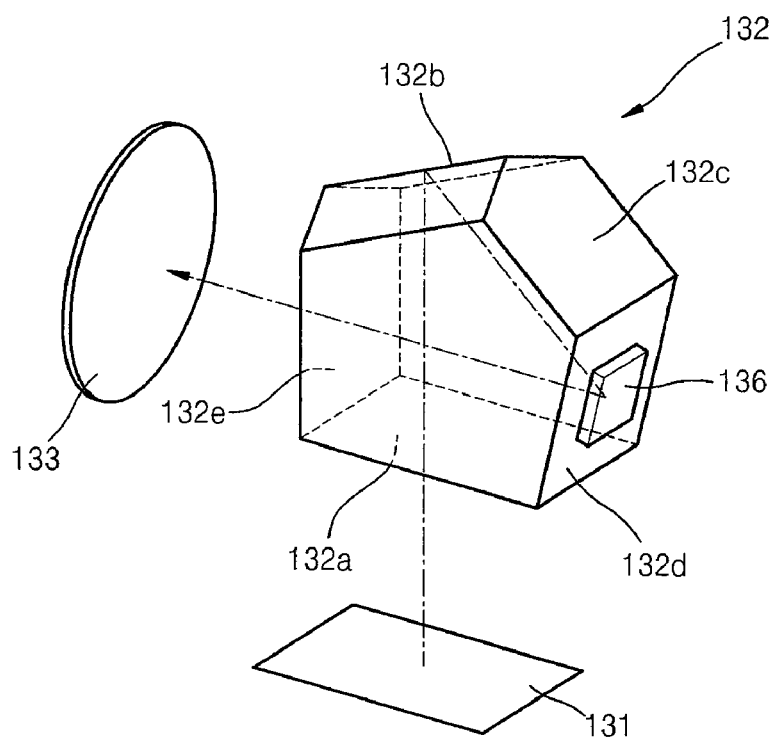
FIG. 5 is an oblique view showing an example of a finder optical system of a digital photographing apparatus, according to another embodiment of the present invention.
Figure 6:
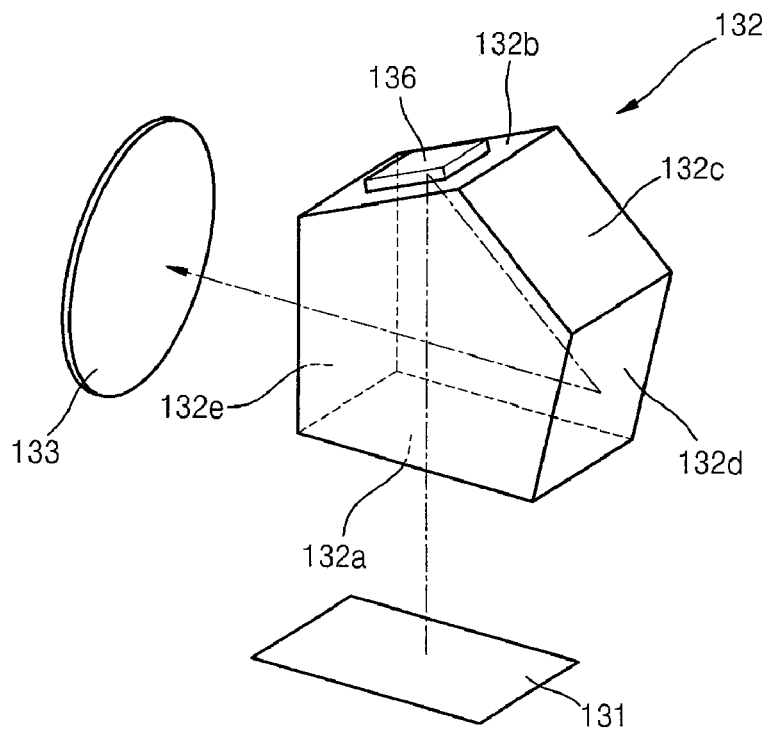
FIG. 6 is an oblique view showing an example of a finder optical system of a digital photographing apparatus, according to another embodiment of the present invention.
Figure 7:
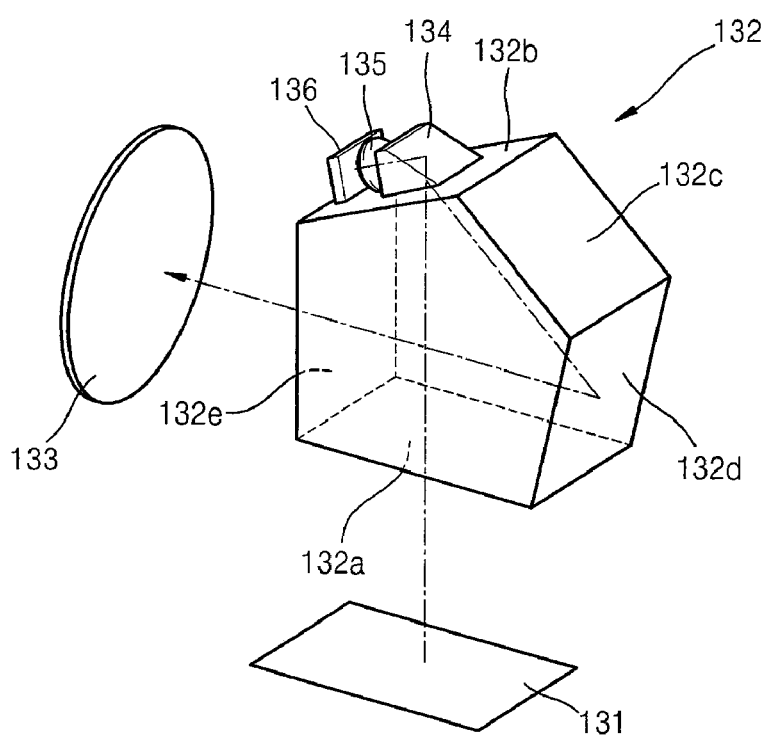
FIG. 7 is an oblique view showing an example of a finder optical system of a digital photographing apparatus, according to another embodiment of the present invention.

FIGS. 5 through 7 are oblique views showing respective examples of a finder optical system of a digital photographing apparatus, according to other embodiments of the present invention.

As shown in the example of FIG. 6, the surface 132*b* may be the third surface and the image sensor 136 for live view may be disposed on the surface 132*b*. In latter case, as shown in the example of FIG. 7, the sub prism 134 and the sub lens 135 may be included.

Figure 8:
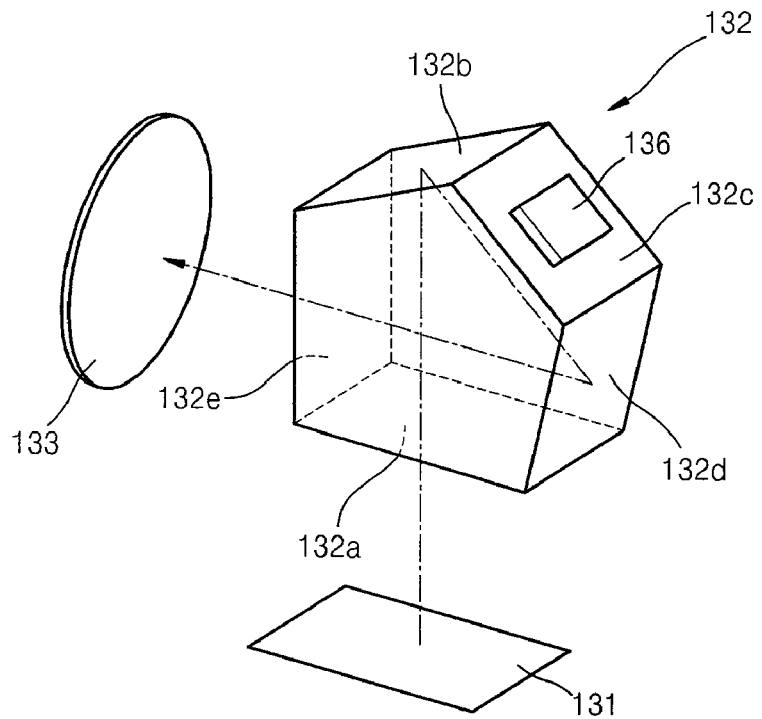
FIG. 8 is an oblique view showing an example of a finder optical system of a digital photographing apparatus according to another embodiment of the present invention.

FIG. 8 is an oblique view showing an example of a finder optical system of a digital photographing apparatus according to another embodiment of the present invention. Unlike the finder optical system of the digital photographing apparatuses according to the previous embodiments shown in the examples of FIGS. 2 through 7, in the finder optical system of the digital photographing apparatus of the example of FIG. 8, the third surface on which the image sensor 136 for live view is disposed is a surface 132*c* rather than the surfaces 132*b* and 132*d* which reflect lights incident onto the prism unit 132 via the first surface 132*a* and incident onto the viewfinder 133 via the second surface 132*e*, and at least a portion of the third surface 132*c* is transmissive.

As described above, light reflected by the main mirror 124 is incident onto the prism unit 132 via the focusing screen 131. Therefore, light travelling along a path shown in alternated long and short dash lines in the examples of FIGS. 2 through 8 is reflected by predetermined surfaces of the prism unit 132 and travels toward the viewfinder 133.

Figure 9:
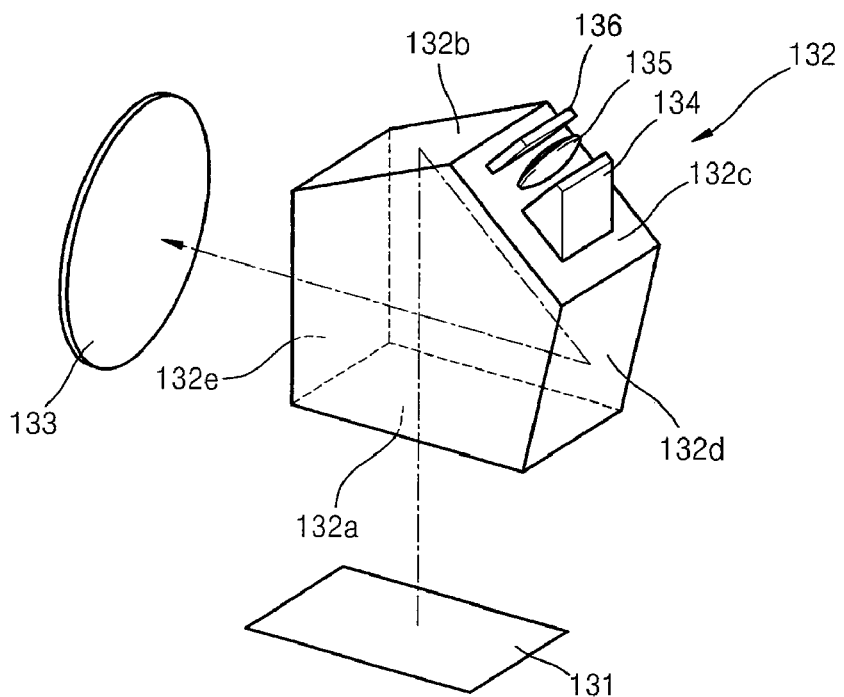
FIG. 9 is an oblique view showing an example of a finder optical system of a digital photographing apparatus, according to another embodiment of the present invention.

Meanwhile, the focusing screen 131 is formed of a material such as frosted glass so that light which passed through the material also travels along an optic axis not perpendicular to the optic axis along which light has been incident to the material. Therefore, not all of light reflected by the main mirror 124 travels along the path shown in alternated long and short dash lines in the examples of FIGS. 2 through 8 after passing through the focusing screen 131. Furthermore, part of light reflected by the main mirror 124 also travels toward the surface 132*c* of the prism unit 132. The surface 132*c* of the prism unit 132 is a surface which reflects light incident onto the prism unit 132 via the first surface 132*a* and incident onto the viewfinder 133 via the second surface 132*e*. Therefore, live view images can be displayed on a display unit effectively even if the image sensor 136 is disposed on the surface 132*c*. In this case, since light incident onto the surface 132*c* is not light travelling toward the viewfinder 133, at least part of the surface 132*c* may be totally photo-transmissive instead of being semi photo-transmissive. In this case, various changes can be made. For example, as shown in FIG. 9, which is an oblique view showing an example of a finder optical system of a digital photographing apparatus according to another embodiment of the present invention, the sub prism 134 and the sub lens 135 may be included.

Hereinafter, a method of controlling a digital photographing apparatus according to an embodiment of the present invention will be described. According to the method, a main mirror is positioned on a path along which light which passed through a lens unit travels such that at least part of the light is reflected toward in a first direction. Then, when the light reflected by the main mirror is incident onto a prism unit, which is located in the first orientation toward which the light is reflected, part of the light travels toward a viewfinder located in a second orientation, and remaining part of the light travels toward an image sensor for live view disposed on one of surfaces of the prism unit. Then, data is obtained from the light incident to the image sensor for live view and live view images are displayed on a display unit. Thus, live view images can be displayed even on a display unit of a SLR type digital photographing apparatus.

Meanwhile, when a photographing operation is performed in response to a signal from a user, a position of a main mirror may be changed such that the main mirror is not positioned on a path of light which passed through a lens unit. Thus, the light can be incident onto an imaging device. In this case, live view images may not be displayed while the light which passed the lens unit is being incident onto the imaging device.

Accordingly, a SLR type digital photographing apparatus capable of displaying live view images on a display unit may be embodied.

A program according to the embodiments mentioned above and variants thereof may be stored in a recording medium. Here, as shown in the example of FIG. 1, examples of the recording medium include the EPROM 147, the SDRAM 148, the flash memory 150, and the like, or a separate recording medium. Examples of the separate recording media include magnetic storage media (for example, ROM, floppy disks, hard disks, and the like), and optical recording media (for example, CD-ROMs or DVDs or the like).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus comprising:
a lens unit through which light bouncing off a subject to be photographed passes;
an imaging device generating image data when the light that passed through the lens unit is incident thereon;
a main mirror disposed between the lens unit and the imaging device, wherein the position of the main mirror can be changed so that the main mirror either reflects at least part of the light which passed through the lens unit in a first direction, or the main mirror is not positioned on a path of the light which passed through the lens unit such that the light can be incident onto the imaging device;
a prism unit located in the first direction so that light reflected by the main mirror is incident onto the prism unit and is output in a second direction when at least part of the light which passed through the lens unit is reflected by the main mirror;
a viewfinder located in the second direction so that at least part of light output from the prism unit passes through the viewfinder; and
an image sensor for live view, disposed on one surface of the prism unit.

2. The digital photographing apparatus of claim 1, wherein the prism unit comprises a pentaprism.

3. The digital photographing apparatus of claim 1, wherein the prism unit comprises a plurality of prisms.

4. The digital photographing apparatus of claim 1, wherein, when a surface onto which light reflected by the main mirror is incident is a first surface, a surface through which light output from the prism unit finally passes is a second surface, and a surface on which the image sensor for live view is disposed is a third surface, the third surface is one of surfaces of the prism unit excluding the first surface and the second surface.

5. The digital photographing apparatus of claim 4, wherein at least a portion of the third surface is photo-transmissive so that at least part of light incident onto the prism unit is transmitted through the portion of the third surface and is incident onto the image sensor for live view.

6. The digital photographing apparatus of claim 4, wherein the third surface of the prism unit is one of surfaces which reflects light incident onto the prism unit via the first surface and incident onto the viewfinder via the second surface, and at least a portion of the third surface is photo-transmissive.

7. The digital photographing apparatus of claim 4, wherein the third surface of the prism unit is not one of surfaces which reflects light incident onto the prism unit via the first surface and incident onto the viewfinder via the second surface, and at least a portion of the third surface is photo-transmissive.

8. The digital photographing apparatus of claim 4, wherein a sub prism is disposed on the third surface of the prism unit, and light which passed through the third surface passes through the sub prism and is incident onto the image sensor for live view.

9. The digital photographing apparatus of claim 8, further comprising a sub lens disposed between the sub prism and the image sensor for live view.

10. A method of controlling a digital photographing apparatus, the method comprising:

(a) positioning a main mirror on a path along which light which passed through a lens unit travels so that at least part of the light is reflected in a first direction; and (b) when light reflected by the main mirror is incident onto a prism unit disposed in the first direction in (a), at least part of the light travels toward a viewfinder disposed in a second direction, and remaining part of the light travels toward an image sensor for live view disposed on one of surfaces of the prism unit, so that data is obtained from the light incident onto the image sensor for live view and live view images are displayed on a display unit.

11. The method of claim 10, further comprising (c) changing the position of the main mirror such that the main mirror is not positioned on the path along which light which passed through the lens unit travels so that the light which passed through the lens unit is incident onto an imaging device.

12. The method of claim 11, wherein live view images are not displayed on the display unit while light which passed through the lens unit is incident onto the imaging device.

13. A non-transitory storage medium having recorded thereon a computer program that, when executed, causes a machine to at least perform the method of claim 10.

* * * * *